(12) United States Patent
Carlino (10) Patent No.: US 7,431,161 B2
(45) Date of Patent: Oct. 7, 2008

(54) COSMETIC CARRIER ATTACHMENT FOR ELECTRONIC COMMUNICATIONS DEVICE

(76) Inventor: Christina Carlino, 4304 E. Stamford, Phoenix, AZ (US) 85016

( * ) Notice: Subject to any disclaimer, the term of this patent is extended or adjusted under 35 U.S.C. 154(b) by 961 days.

(21) Appl. No.: 10/188,017

(22) Filed: Jul. 1, 2002

(65) Prior Publication Data
US 2003/0000865 A1 Jan. 2, 2003

Related U.S. Application Data (60) Provisional application No. 60/301,963, filed on Jun. 29, 2001.

(51) Int. Cl.
*B65D 69/00* (2006.01)
(52) U.S. Cl. .................. 206/581; 206/235; 132/316; 455/344
(58) Field of Classification Search .............. 206/0.81, 206/38, 235, 581, 823; 132/314–316; 455/231, 455/344, 351
See application file for complete search history.

(56) References Cited

U.S. PATENT DOCUMENTS

| | | | | |
|---|---|---|---|---|
| 3,179,891 | A * | 4/1965 | Sharma | 206/235 |
| 4,478,330 | A * | 10/1984 | Lin | 206/38 |
| 4,828,153 | A * | 5/1989 | Guzik et al. | 224/242 |
| 4,933,988 | A * | 6/1990 | Thibault | 455/349 |
| 4,951,817 | A * | 8/1990 | Barletta et al. | 206/38 |
| 5,379,884 | A * | 1/1995 | Bigott | 206/38 |
| 5,499,710 | A * | 3/1996 | Hoffman | 206/0.81 |
| 5,813,153 | A * | 9/1998 | Maglio | 40/1.6 |
| 6,053,310 | A * | 4/2000 | Mandel et al. | 206/0.81 |

OTHER PUBLICATIONS

Undated article entitled "ECRM Show News" from unknown source.

* cited by examiner

*Primary Examiner*—Luan K Bui
(74) *Attorney, Agent, or Firm*—Snell & Wilmer L.L.P.

(57) ABSTRACT

A cosmetic carrier attachment for an electronic communications device includes a housing for retaining cosmetics and various configurations and elements for removably attaching the housing to the electronic communications device. One configuration includes a lip member attached to the back of the communications device and a channel contained within the back of the housing for engaging the lip member.

11 Claims, 10 Drawing Sheets

COSMETIC CARRIER ATTACHMENT FOR ELECTRONIC COMMUNICATIONS DEVICE

CROSS REFERENCE TO RELATED APPLICATION

This application claims the benefit of, and priority to, provisional application having Ser. No. 60/301,963, filed Jun. 29, 2001, which application is hereby incorporated by reference in its entirety.

FIELD OF INVENTION

The present invention generally relates to a cosmetic carrier attachment for an electronics communications device, and more particularly, to a foldable cosmetic carrier case that can be attached to at least one of a cellular telephone or other type of device that is capable of communicating by sending messages via the internet.

BACKGROUND OF THE INVENTION

Electronic communications devices such as cellular telephones and other electronic communications devices capable of communication by sending e-mails over the internet are now being carried on a daily basis by almost everyone. Attachments and accessories for these devices such as carrying cases, battery charges and the like are also being marketed to consumers.

In that most individuals now carry such electronic communications devices as part of their daily routine, it would be advantageous to incorporate a means for carrying other items that are also part of an individual's daily routine along with their electronic communications device. The majority of female consumers typically carry one or more cosmetic products with them, particularly when they are on the go and outside of their homes. Since both electronic communications devices and cosmetic items are typically carried by female consumers as part of their daily routine when outside of their home, it would be advantageous to enable both types of items to be somehow connected to one another to enable a user to efficiently and compactly carry these items.

Accordingly, there is a need for a cosmetic carrier attachment for electronic communications devices which is compact and sleek in design so that it's attachment to such communications devices does not produce a bulky item that would be awkward and inconvenient to carry. There is also a need for a cosmetic carrier attachment for an electronic communications device which includes a means for enabling the cosmetic carrier attachment to be easily attached to and removed from the electronic communications device.

SUMMARY OF THE INVENTION

The cosmetic carrier attachment of the present invention is designed for attachment to an electronic communications device such as a cellular telephone or other device that enables electronic messaging via the internet. The cosmetic carrier attachment includes a cosmetic case capable of holding at least one cosmetic item such as an eye color, a lip color, a cheek color, or a foundation, and means for attaching a back side of the cosmetic case to a back side of an electronic communications device.

In one aspect of the invention, the cosmetic case includes a first half and a second half, wherein at least one of the halves is capable of retaining a cosmetic item, and a hinge connecting the two halves so that one half can be folded over the other half. In another aspect of the invention, the cosmetic case includes a housing capable of retaining at least one cosmetic item and a cover that slidably fits over the housing.

The attachment means for attaching the cosmetic case to the electronic communications device may take one of several forms. For example, the attachment means may include at least one lip member that can be attached to the back side of the electronic communications device and at least one channel contained within the back side of the cosmetic case so that the channel can receive the lip member in order to secure the cosmetic case to the electronic communications device. In another example, a pocket having a slit may be attached to the back side of an electronic communications device and the cosmetic case may have a flap member secured to it so that the slit contained within the pocket can receive the flap member in order to secure the cosmetic case to the electronic communications device. Both the lip member and the pocket may be either permanently or removably attached to the back of the electronic communications device with either a permanent or removable adhesive or the like. In yet another example, the cosmetic case may have a flap member secured to it and the flap member may be used to secure the cosmetic case to an electronic communications device by sliding the flap member between the electronic communications device and a cover for the electronic communications device such as a leather carrying case designed to hold the electronic communications device In still another aspect of the invention, the cosmetic case may also include a mirror and in yet another aspect of the invention, a clip member may also be attached to the cosmetic case. The cosmetic case may be configured in any shape but is especially useful and efficient when configured in a rectangular shape that matches the approximate dimensions of the back of the electronic communications device to which it is attached.

BRIEF DESCRIPTION OF THE DRAWINGS

Additional aspects of the present invention should become evident upon reviewing the non-limiting embodiments described in the specification taken in conjunction with the accompanying figures, wherein like numerals designate like elements, and.

DETAILED DESCRIPTION

The following descriptions are of exemplary embodiments of the invention only, and are not intended to limit the scope, applicability or configuration of the invention in any way. Rather, the following description is intended to provide a convenient illustration for implementing various embodiments of the invention. As will become apparent, various changes may be made in the function and arrangement of the elements described herein without departing from the spirit and scope of the invention. For example, though not specifically described, many shapes and orientations of the cosmetic case and alternative attachment means should be understood to fall within the scope of the present invention.

Figure 1:
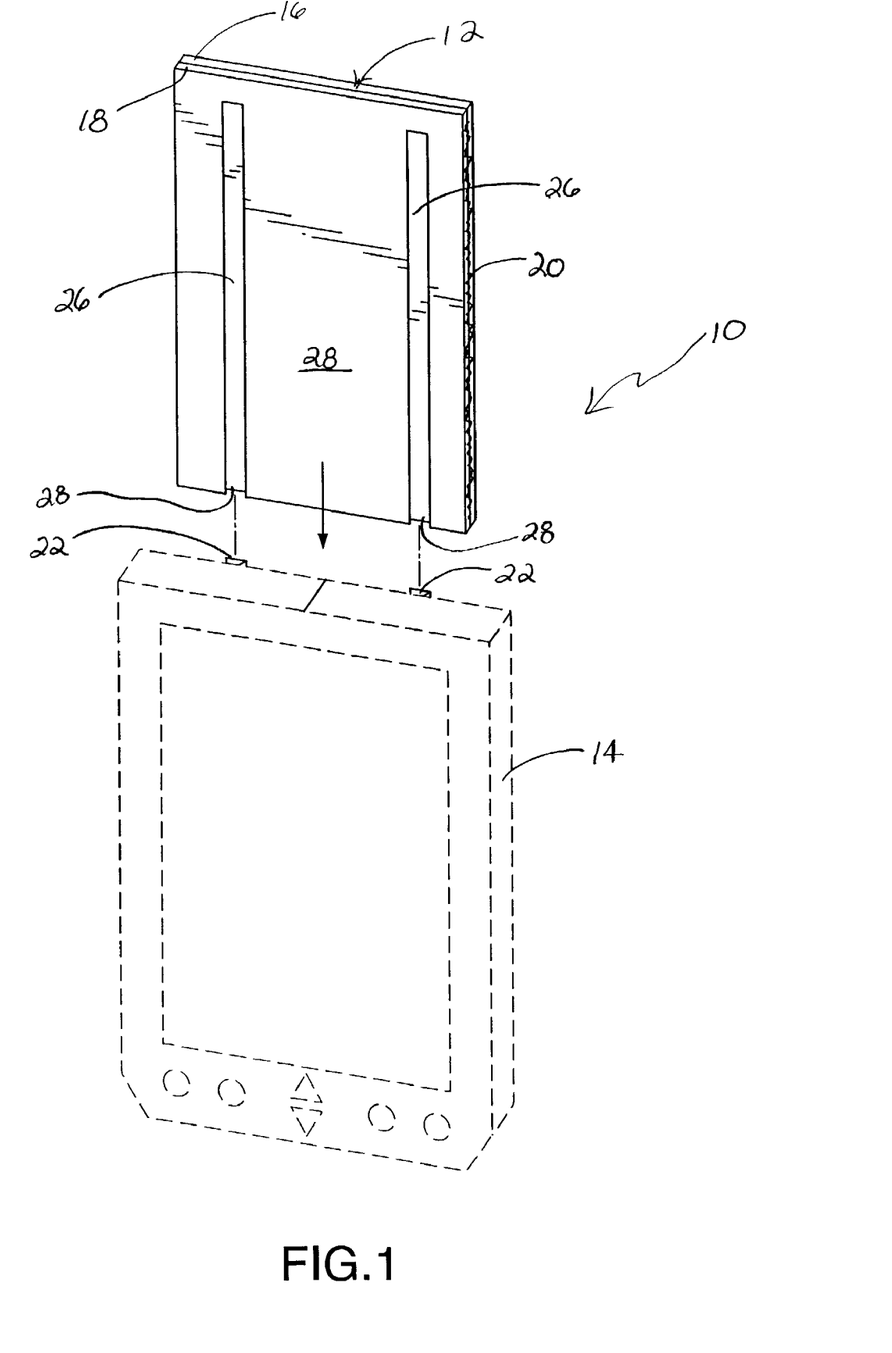
FIG. 1 is a rear perspective view of the cosmetic case with an arrow showing the direction of its engagement with an electronic communications device shown in phantom.

In general, the present invention comprises a cosmetic carrier attachment 10 which includes a cosmetic case 12 and means for attaching cosmetic case 12 to an electronic communications device 14 such as the PALM PILOT shown in phantom in FIG. 1. In the embodiment shown in FIG. 1, cosmetic case 12 comprises a first half 16 and a second half 18 which are connected by a hinge 20 to enable halves 16 and 18 to be folded against one another. Further, the attachment means of the present invention shown in FIG. 1 comprises a pair of lip members 22 (See also FIGS. 1A and 1B) that are attachable to a back side 24 (See FIGS. 1A and 1B) of electronic communications device 14 and a pair of channels 26 located within a back side 28 of cosmetic case 12 which correlate with lip members 22.

It will be understood by those skilled in the art that only one lip member and its associated channel would function to secure an attachment of cosmetic case 12 to electronic communications device 14. Moreover, more than two lip members and their associated channels may also be used to secure such an attachment. In order to ensure that lip members 22 are aligned with channels 26 to ensure that lip members 22 can engage channels 26 for attachment, lip members 22 are preferably engaged with channels 26 prior to attachment to electronic communications device 14. A permanent or removable adhesive or the like is applied to the surface of lip members 22 which are not engaged with channels 26 and the adhesive backed lip members are then applied to electronic communications device 14 while still engaged with channels 26. After securing lip members 22 to back side 24 of electronic communications device 14, lip members 22 can be disengaged from channels 26 by sliding lip members 22 out of an open end 28 of channels 26. This method of attaching lip members 22 to electronic communications device 14 ensures that lip members 22 will be properly aligned with channels 26 contained within back side 28 of cosmetic case 12 when subsequently engaged and re-engaged to attach cosmetic case 12 to electronic communications device 14.

Figure 1A:
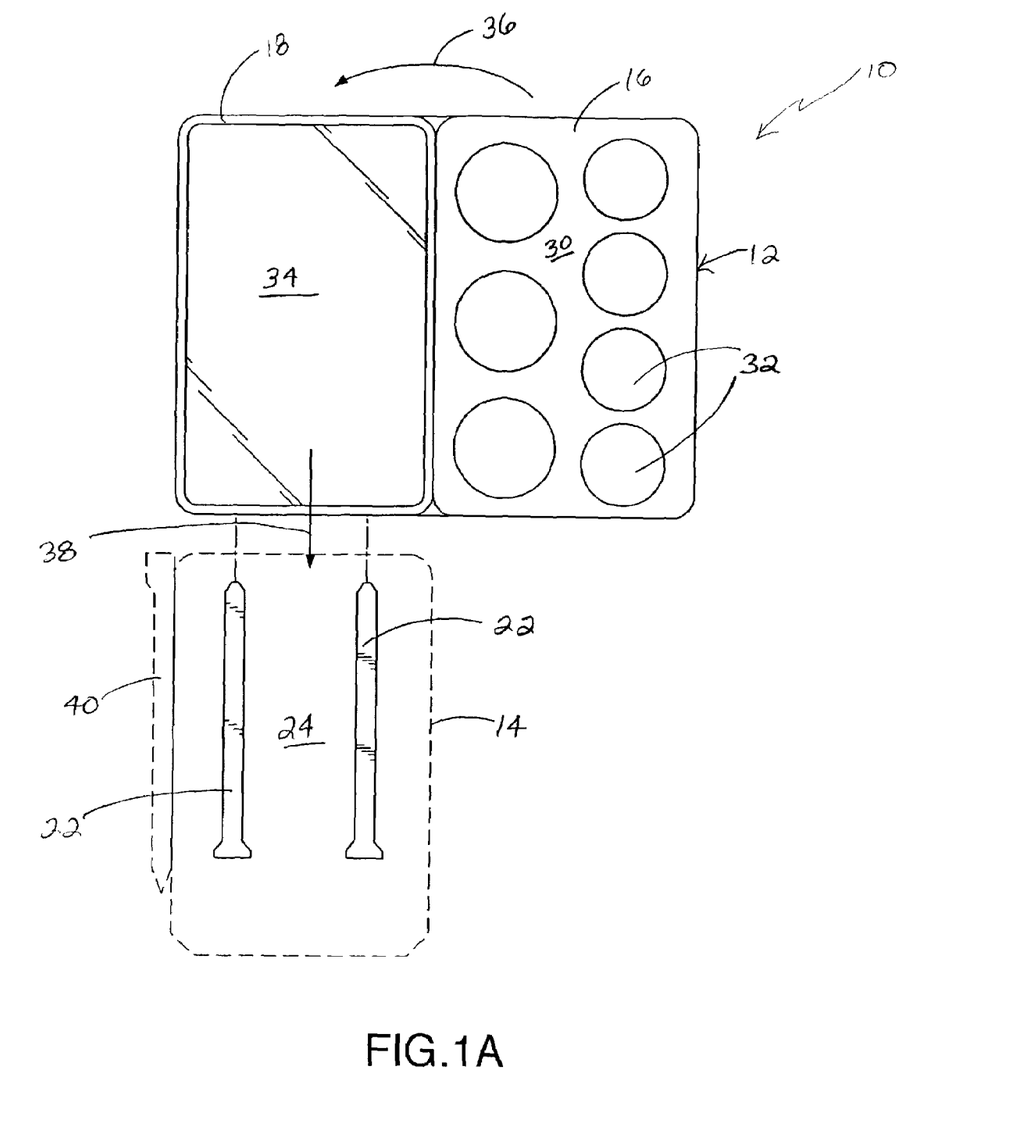
FIG. 1A is a flat plan view of the cosmetic carrier attachment of the present invention showing the lip members attached to the back of an electronic communications device shown in phantom along with arrows showing the direction in which the cosmetic case closes and the direction in which the cosmetic case engages with the lip members.

FIG. 1A is a flat plan view of the embodiment of the cosmetic carrier attachment 10 shown in FIG. 1 illustrating the front of cosmetic case 12 in an open position and back side 24 of electronic communications device 14 having lip members 26 for engagement with channels 26 (See FIG. 1). When in an open position, cosmetic case 12 shows first half 16 having a palette 30 with openings 32 for housing one or more cosmetic items such as lip color, eye color, cheek color and foundation, and second half 18 having a mirror 34. When not in use, first half 16 of cosmetic case 12 is folded over onto second half 18 of cosmetic case 12 along a horizontal length shown by arrow 36. Cosmetic case 12 is then secured to electronic communications device 14 by engaging lip members 24, vertically positioned on back side 24 of electronic communications device 14, with channels 26 contained within back side 28 of cosmetic case 12 by moving cosmetic case 12 in the direction of arrow 38. A stylus pen 40 for aiding in operating electronic communications device 14 is also shown in phantom.

Figure 1B:
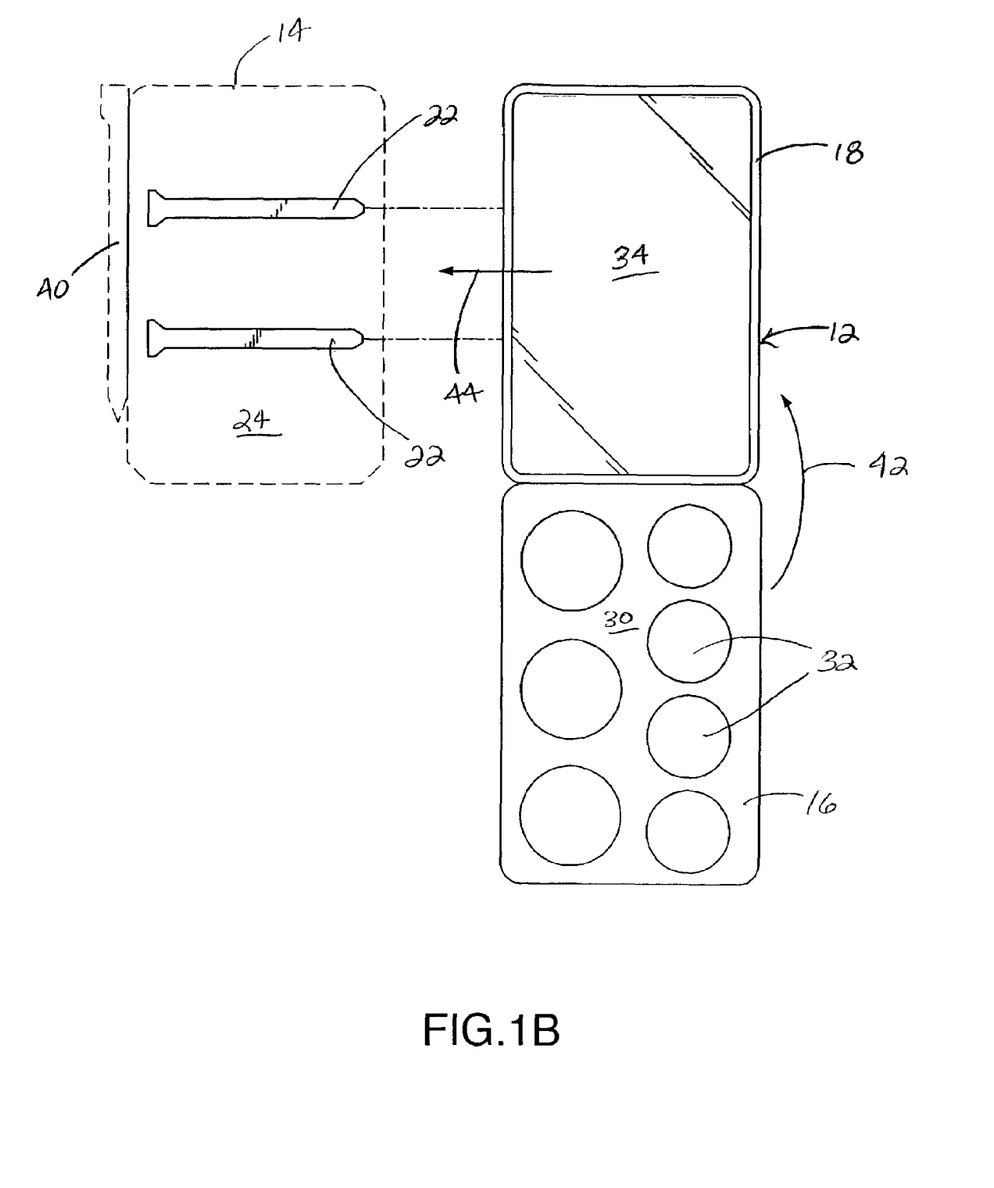
FIG. 1B is a flat plan view of the cosmetic carrier attachment of the present invention shown in FIG. 1A with the exception that the lip members are positioned horizontally along the back of the electronic communications device and the cosmetic case closes along a vertical length instead of along a horizontal length.

Another flat plan view of cosmetic carrier attachment 10 of the present invention is shown in FIG. 1B. This embodiment of cosmetic carrier attachment 10 is the same as that embodiment of cosmetic carrier attachment 10 shown in FIG. 1A with the exception that first half 16 of cosmetic case 12 folds against second half 18 of cosmetic case 12 along a vertical length as shown by arrow 42, and lip members 22 are attached to back side 24 of electronic communications device 14 in a horizontal position. Cosmetic case 12 is secured to electronic communications device 14 by moving cosmetic case 12 in the direction of arrow 44 to engage lip members 22 with channels 26 located within back side 28 of cosmetic case 12.

Figure 2:
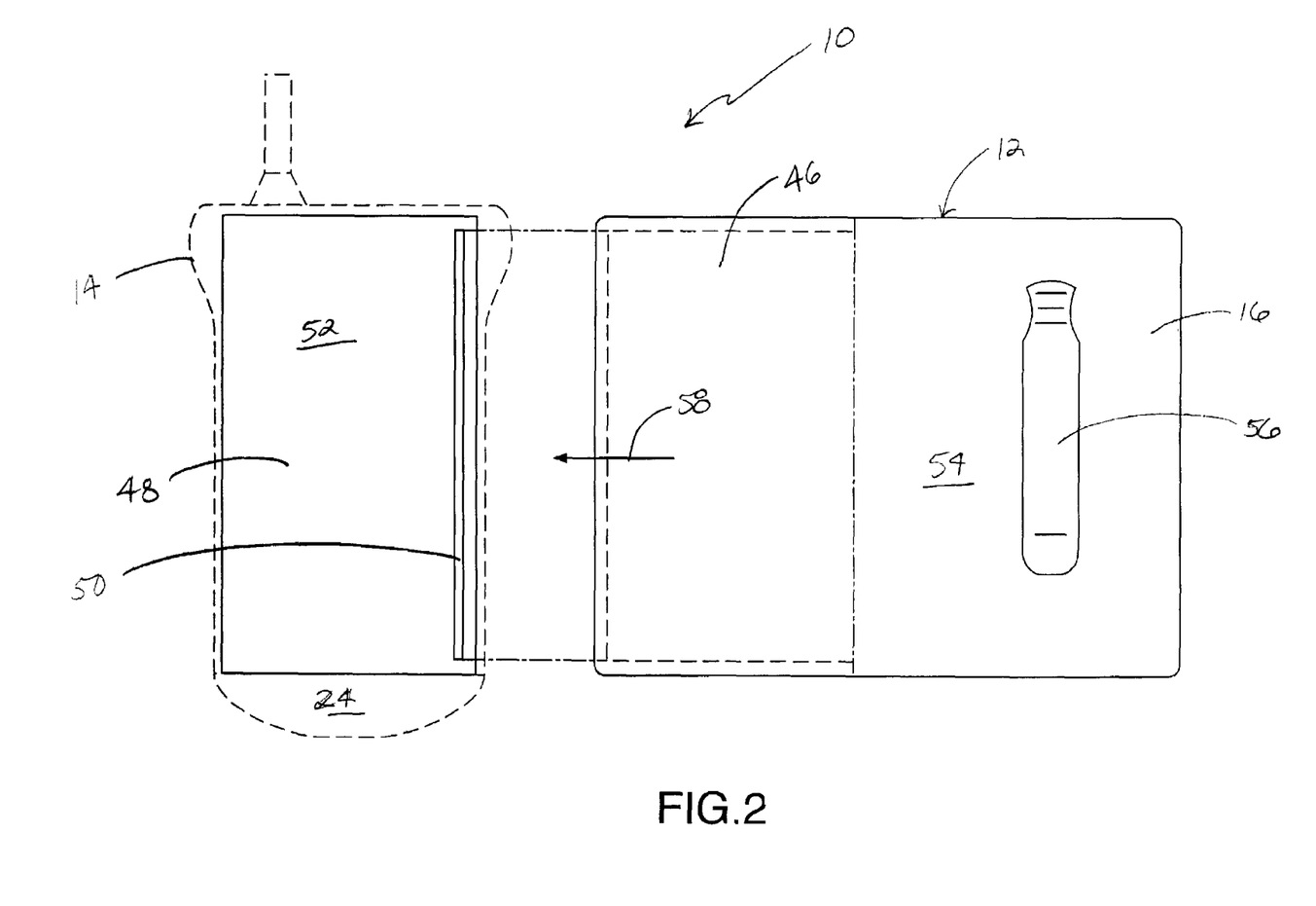
FIG. 2 is a flat plan view of another embodiment of the cosmetic carrier attachment of the present invention showing the direction of attachment to the back of a cellular telephone shown in phantom.

FIG. 2 shows a rear flat plan view of another embodiment of cosmetic carrier attachment 10 of the present invention. In this embodiment, cosmetic case 12 is attached to electronic communications device 14, here pictured as a cellular telephone shown in phantom, by way of a flap member 46 attached to cosmetic case 12 which fits into pocket 48 having slit 50 for engaging flap member 46. Pocket 48 may be created by attaching a single panel member 52 having a slit 50 to a back side of electronic communications device 14 around the edges of panel member 52. Alternatively, pocket 48 may be created by attaching two panels member to one another with one panel member having a slit 50 and then attaching the panel member without the slit to back side 24 of electronic communications device 14.

Flap member 46 is preferably comprised of any thin durable material such as leather, for example, which may also cover a back side of second half 18 to ensure that it does not become detached from cosmetic case 12. A back side 54 of first half 16 of cosmetic case 12 may further include a clip member 56 attached thereto in order to enable the combined cosmetic carrier attachment and electronic communications device to be clipped onto a user for easy transport and carrying. In order to attach cosmetic case 12 to electronic communications device 14, flap member 46 of cosmetic case 12 is moved in the direction of arrow 58 so that flap member 46 can engage slit 50 of pocket 48.

Figure 2A:
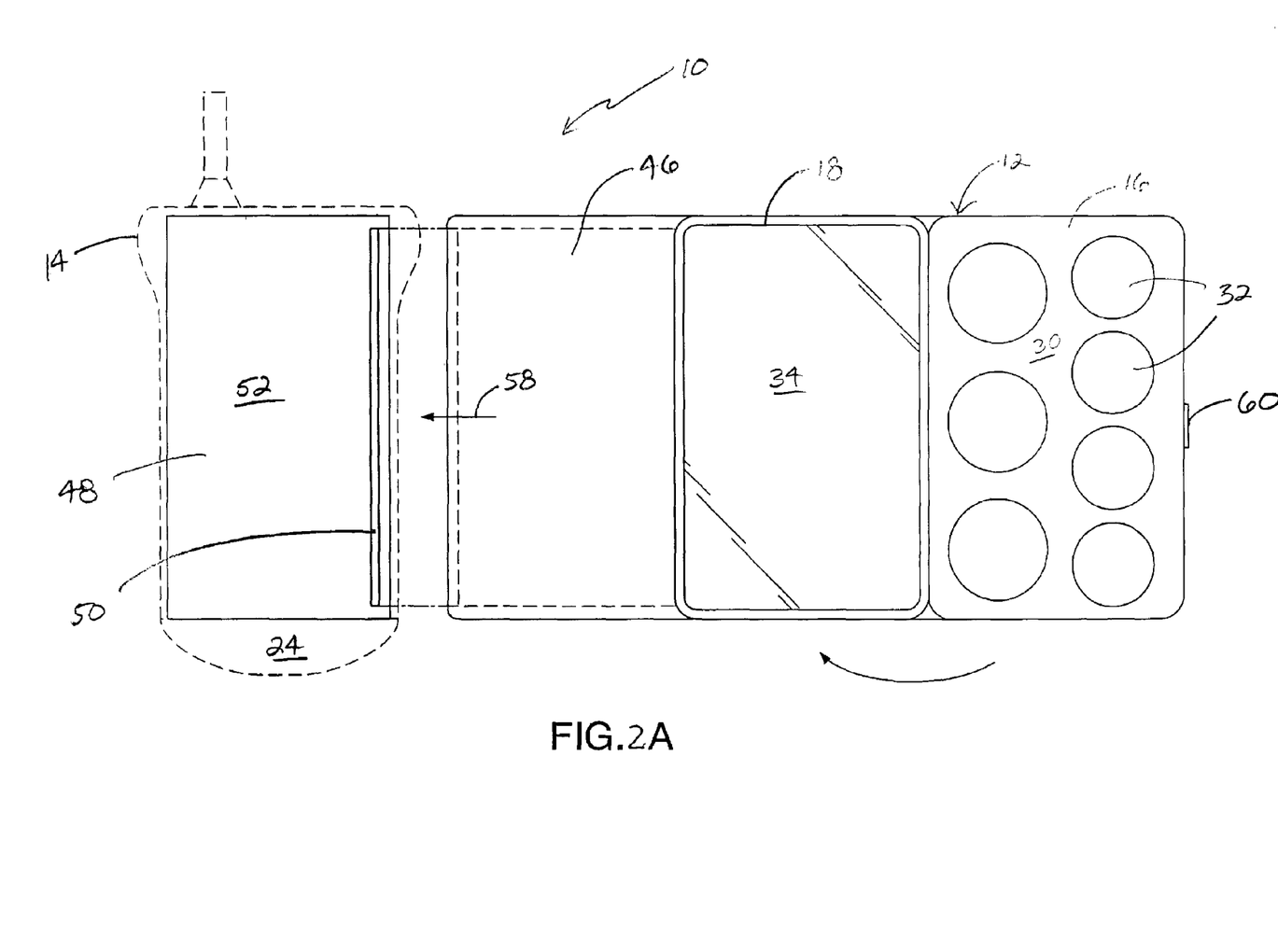
FIG. 2A is a flat plan view of the embodiment of the cosmetic carrier attachment shown in FIG. 2 with the cosmetic case shown in an open position.

FIG. 2A shows the embodiment of cosmetic carrier attachment 10 shown in FIG. 2 with cosmetic case 12 in an open position. First half 16 of cosmetic case 12 includes a palette 30 with openings 32 for housing one or more cosmetic items as previously explained with reference to FIG. 1A. Further, second half 18 also includes a mirror as previously described with reference to FIG. 1A. Also, as previously described with reference to FIG. 2, flap member 46 of cosmetic case 12 is moved in the direction of arrow 58 so that flap member 46 can engage with slit 50 of pocket 48 in order to attach cosmetic case 12 to electronic communications device 14. First and second halves 16 and 18 of cosmetic case 12 may be secured to one another by way of a clasp 60 or any other securing means known in the art for securing one half of a cosmetic case to another.

Figure 3A:
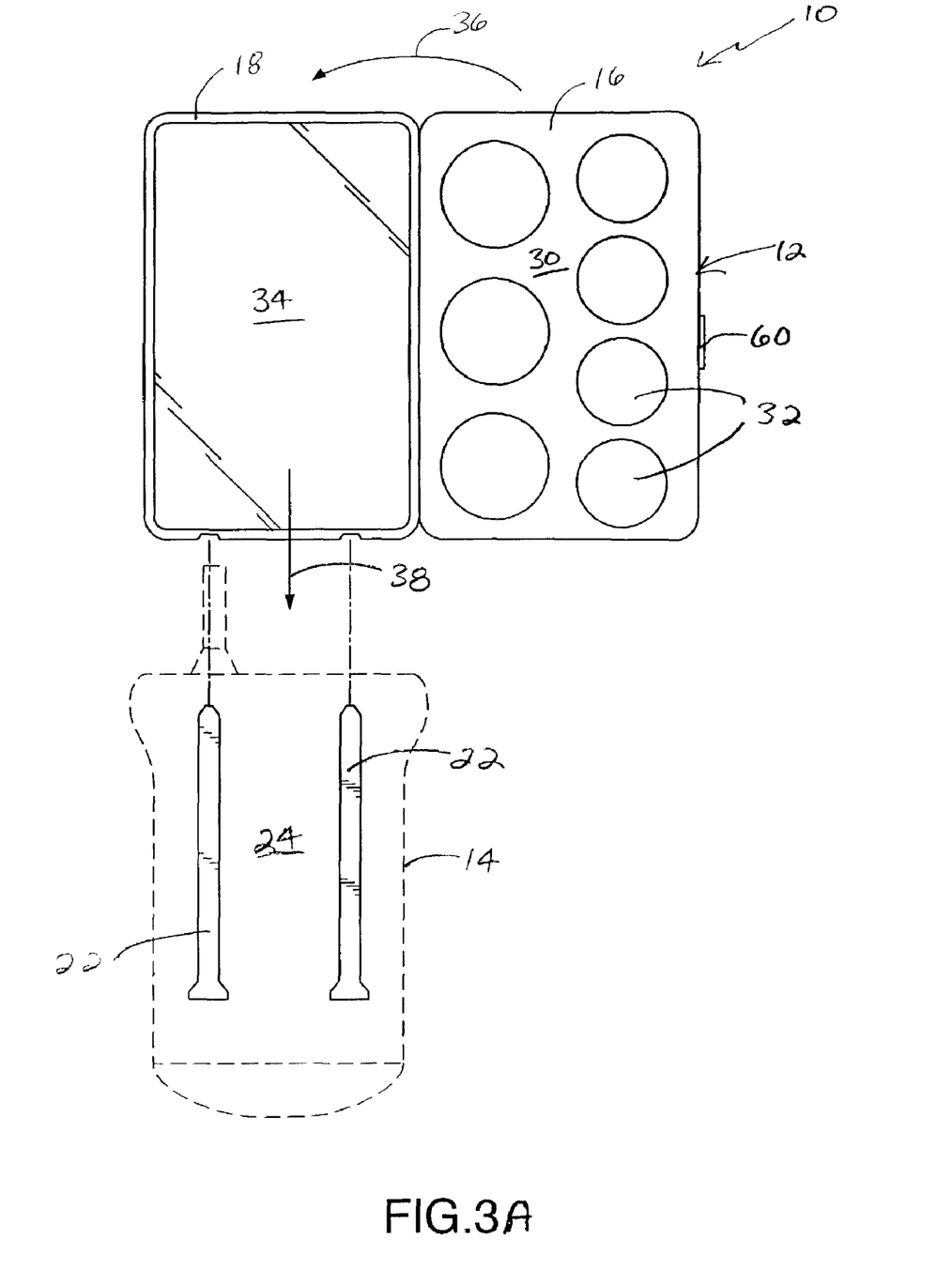
FIG. 3A is the embodiment of the cosmetic carrier attachment of FIG. 1A showing attachment to a cellular telephone shown in phantom.
Figure 3B:
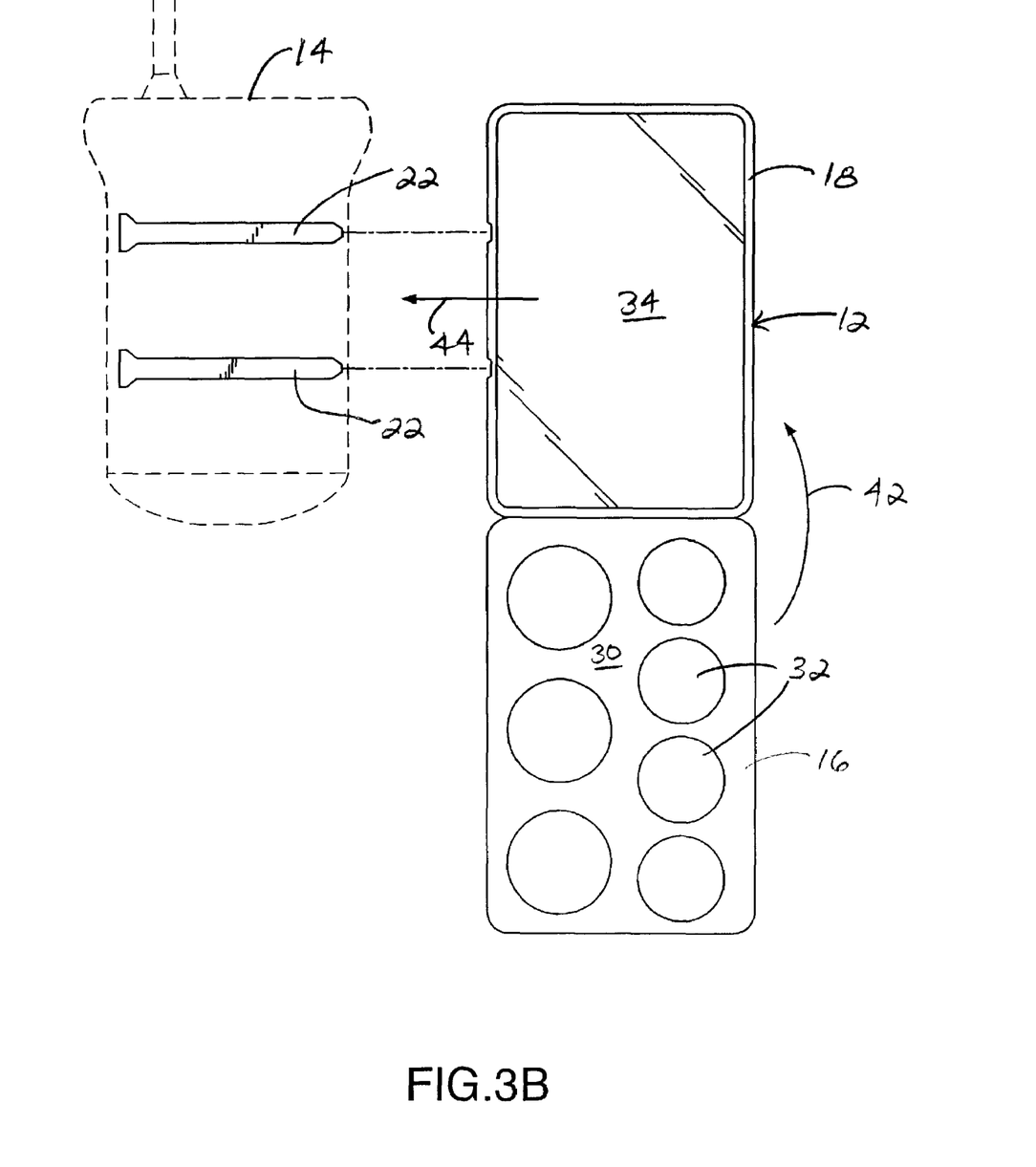
FIG. 3B is the embodiment of the cosmetic carrier attachment of FIG. 1B showing attachment to a cellular telephone shown in phantom.

FIG. 3A illustrates the embodiment of cosmetic carrier attachment 10 of the present invention shown in FIG. 1A where cosmetic case 12 is shown to engage with a cellular telephone instead of a PALM PILOT or similar type of electronic communications device as shown in FIG. 1A. Similarly, FIG. 3B illustrates the embodiment of cosmetic carrier attachment 10 of the present invention shown in FIG. 1B where cosmetic case 12 is shown to engage with a cellular telephone instead of a PALM PILOT or similar type of electronic communications device. Further, like FIGS. 1A and 1B, respectively, the embodiment of cosmetic case 12 in FIG. 3A folds along a horizontal length as indicated by arrow 36 while the embodiment of cosmetic case 12 in FIG. 3B folds along a vertical length as indicated by arrow 42.

Figure 4:
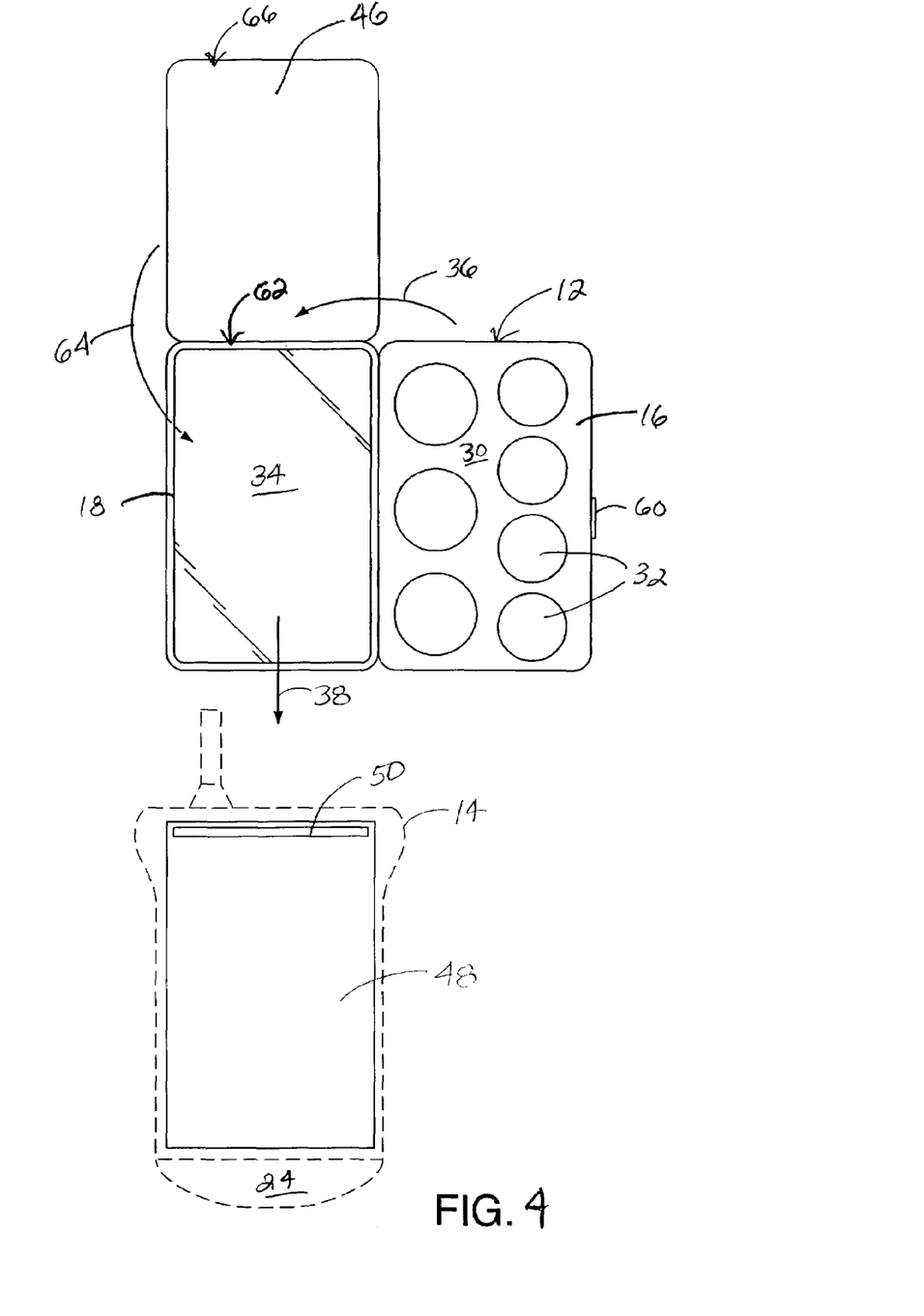
FIG. 4 is a flat plan view showing another embodiment of the cosmetic carrier attachment of the present invention similar to the embodiment shown in FIG. 2A with the exception that the flap member and slit are positioned vertical engagement instead of horizontal engagement.

Turning now to FIG. 4, another embodiment of cosmetic carrier attachment 10 of the present invention is shown. In this embodiment, cosmetic carrier attachment 10 comprises cosmetic case 12 which is attached to electronic communications device 14 by engaging flap member 46 of cosmetic case 12 with slit 50 of pocket 48 which is attached to back side 24 of electronic communications device 14 much like that embodiment of cosmetic carrier attachment 10 shown and described with reference to FIGS. 2 and 2A. However, in this embodiment, flap member 46 is attached to a top edge 62 of second half 18 of cosmetic case 12 instead of to a side edge as shown in FIG. 2. In order to attach cosmetic case 12 to electronic communications device 14, flap member 46 is bent against a back side of second half 18 of cosmetic case 12 in the direction of arrow 64 so that top edge 66 of flap member 46 can engage slit 50 in pocket 48 by moving flap member 46 in the direction of arrow 38 after flap member 46 is beant against back side of second half 18 of cosmetic case 12. Cosmetic case 12 is closed by folding first half 16 over second half 18 in the direction of arrow 36.

Figures 5, 5A:
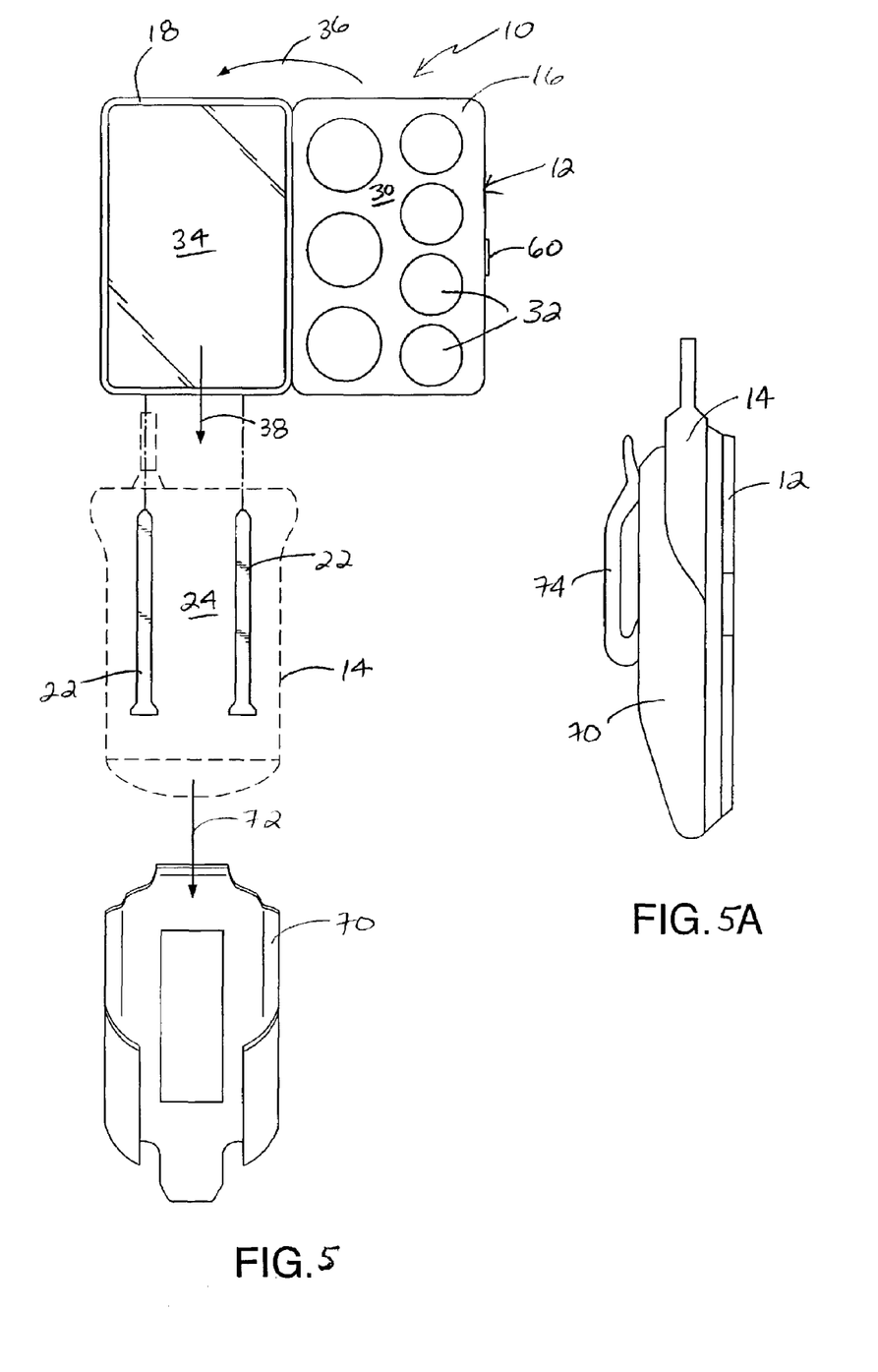
FIG. 5 is a flat plan view of the embodiment of the cosmetic carrier attachment shown in FIG. 3A but further includes a clip housing for housing the cellular telephone and the cosmetic carrier attachment.
FIG. 5A is a side elevational view of the embodiment of the present invention shown in FIG. 5 after the cosmetic case is attached to the cellular telephone which is in turn attached to the clip housing.

FIG. 5 illustrates the same embodiment of cosmetic carrier attachment 10 of the present invention sown in FIG. 3A with the addition of a clip housing or holster 70 which is capable of retaining the combined cosmetic carrier attachment 10 and electronic communications device 14. The combined attachment 10 and device 14 are slid into holster 70 as shown by arrow 72. A clip 74 is attached to a back of holster 70 as shown in FIG. 5A for easy transport and carrying of the combined attachment 10 and device 14 by a user.

Figure 6:
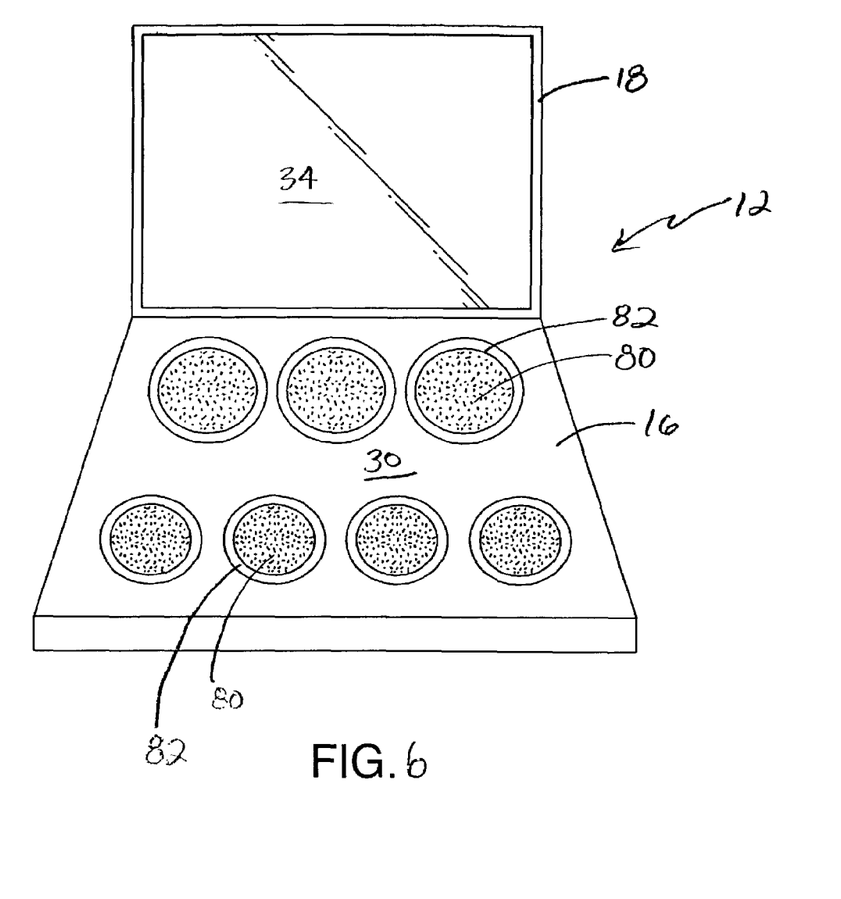
FIG. 6 is a perspective view of the cosmetic case of the present invention shown in an open position containing cosmetic items.

Finally, FIG. 6 illustrates a perspective view of cosmetic case 12 of the present invention in an open position. Cosmetic case 12 includes first half 16 having a palette 30 with openings for housing one or more cosmetic items 80 which may be contained in cosmetic tins 82 so that they can be easily replaced once they are used up, and second half 18 containing mirror 34.

It should be apparent that many alterations of the cosmetic carrier attachment embodiments described herein may be made. For example, although the cosmetic case is shown to be rectangular in shape in the above described embodiments, the cosmetic case may take on any shape or configuration as long as it is thin enough to ensure that its attachment to an electronic communications device would not result in a combination that would be too awkward or inconvenient to carry by a user. Further, the attachment means described above can be configured and arranged in a variety of ways for attaching cosmetic case 12 to electronic communications device 14.

Lastly, various aspects of the invention have been described in illustrative embodiments. Of course, many modifications and combinations of the above-described structures, arrangements, proportions, elements, materials and components, used in the practice of the invention, in addition to those not specifically described, may be varied and particularly adapted to specific environments and operating requirements without departing from those principles.

The invention claimed is:

1. A removable cosmetic carrier attachment for attachment to any electronic communications device comprising:
   a cosmetic case
   at least one channel located within a back side of the cosmetic case; and
   at least one lip member removably contained within the channel wherein an exterior surface of the lip member can be removably attached to any electronic communications device by a removable adhesive.

2. The removable cosmetic carrier attachment of claim 1 wherein said cosmetic case includes a housing for housing at least one of a lip color, an eye color, a cheek color, and a foundation.

3. The removable cosmetic carrier attachment of claim 1 wherein said cosmetic case includes a mirror.

4. The removable cosmetic carrier attachment of claim 1 further comprising a holster having a clip member, said holster being capable of receiving said electronic communications device wherein a back of said electronic communications device containing said removable cosmetic carrier attachment faces outward and away from said clip.

5. The removable cosmetic carrier attachment of claim 1 wherein said cosmetic case comprises a thin, rectangular shape.

6. The removable cosmetic carrier attachment of claim 5 wherein said cosmetic case comprises a first half, a second half, and a hinge connecting said first and second halves to one another such that one half can be folded over the other half.

7. The removable cosmetic carrier attachment of claim 6 wherein said hinge connects a longest length of each of said halves.

8. The removable cosmetic carrier attachment of claim 6 wherein said hinge connects a shortest length of each of said halves.

9. The removable cosmetic carrier attachment of claim 1 wherein said cosmetic case comprises a sleeve member.

10. The removable cosmetic carrier attachment of claim 6 wherein said first half comprises a housing for retaining a cosmetic item and said second half comprises a mirror.

11. A removable cosmetic kit for attachment to any electronic communications device comprising:
    a housing for retaining at least one cosmetic item;
    a cover member for said housing;
    at least one channel located within a back side of the housing; and
    at least one lip member removably contained within the channel wherein an exterior surface of the lip member can be removably attached to any electronic communications device by a removable adhesive.

* * * * *